United States Patent [19]
Han

[11] Patent Number: 6,007,038
[45] Date of Patent: Dec. 28, 1999

[54] TILT AND SWIVEL APPARATUS FOR A DISPLAY MONITOR

[75] Inventor: Min Goo Han, Seoul, Rep. of Korea

[73] Assignee: Daewoo Electronics Co., Ltd., Seoul, Rep. of Korea

[21] Appl. No.: 09/215,196

[22] Filed: Dec. 18, 1998

[30] Foreign Application Priority Data

Dec. 27, 1997 [KR] Rep. of Korea ....................... 97-75252

[51] Int. Cl.[6] ........................... A47B 91/00; A47G 29/00
[52] U.S. Cl. ...................... 248/371; 248/346.06; 248/923
[58] Field of Search .............................. 248/371, 346.06, 248/917, 919–923

[56] References Cited

U.S. PATENT DOCUMENTS

| | | | |
|---|---|---|---|
| 4,555,990 | 12/1985 | Egawa | 108/20 |
| 4,621,782 | 11/1986 | Carlson et al. | 248/183 |
| 4,690,362 | 9/1987 | Helgeland | 248/404 |
| 4,905,543 | 3/1990 | Choi | 74/827 |
| 5,024,415 | 6/1991 | Purens | 248/923 |
| 5,124,805 | 6/1992 | Chung et al. | 358/248 |
| 5,518,216 | 5/1996 | Wu | 248/371 |
| 5,683,068 | 11/1997 | Chase et al. | 248/371 |
| 5,715,138 | 2/1998 | Choi | 361/681 |

OTHER PUBLICATIONS

Lowrie and Thorpe, IBM Technical Disclosure, vol. 24, No. 1A, Jun. 1981.

*Primary Examiner*—Derek J. Berger
*Assistant Examiner*—Michael Nornberg
*Attorney, Agent, or Firm*—Pillsbury Madison & Sutro LLP

[57] ABSTRACT

An apparatus for tilting and swiveling a display monitor using a remote controller is provided. A tilt member detachably connected to the bottom surface of the display monitor is supported on the top surface of a swivel member. A plurality of guide blocks and an arcuate rack gear member are provided on the bottom surface of the tilt member. The guide blocks are accommodated in grooves of the swivel member to guide tilt movement of the tilt member relative to the swivel member. A motor moving back and forth by a solenoid device is mounted on the swivel member. A swivel member is provided on the end of the motor shaft so as to be engaged with a stationary gear member fixed on a vertical shaft of a base member. A tilt gear member is driven by the motor only when the motor moves backwards by the solenoid device and rotates the rack gear member of the tilt member. If a tilting or swiveling button of a remote controller is pressed, a power is applied directly to the motor or sequentially supplied to the solenoid device and the motor and the display monitor tilts or swivels.

3 Claims, 2 Drawing Sheets

TILT AND SWIVEL APPARATUS FOR A DISPLAY MONITOR

BACKGROUND OF THE INVENTION

1. Field of the Invention

The present invention relates to an apparatus for tilting and swiveling a display monitor for a personal computer, and more particularly, to an apparatus for mechanically tilting and swiveling a display monitor using a remote controller.

2. Description of the Related Art

Various arrangements for tilting or swiveling a monitor relative to a base have been developed and used. Examples of such conventional arrangements are disclosed in U.S. Pat. Nos. 5,683,068 and 5,024,415. In the conventional arrangements, a force must be directly applied to a monitor by a user to tilt or swivel the display monitor. Thus, in case of a heavy monitor, it is quite difficult to manipulate the display monitor.

SUMMARY OF THE INVENTION

To solve the above problem, it is an object of the present invention to provide a tilt and swivel apparatus for a display monitor, for mechanically tilting and swiveling the display monitor and controlling tilt and swivel movements using a remote controller.

To achieve the above object, there is provided a tilt and swivel apparatus for a display monitor including a tilt member detachably fixed to the bottom surface of the display monitor, a swivel member for supporting the tilt member thereon and permitting the same to tilt but not to swivel relative thereto, and a base member for rotatably supporting the swivel member about a vertical shaft thereof.

A stationary gear member is fixed on the vertical shaft of the base member. An electric motor is mounted slidably on the swivel member and moves back and forth towards the vertical shaft by a solenoid device. A swivel gear member is driven by the motor and engaged with the stationary gear member at its advanced position.

A rack gear member extending from the bottom surface of the tilt member passes through a slot of the swivel member and rotates with the tilt member by a tilt gear member driven by the motor at its retracted position.

According to the present invention, when a swiveling button of a remote controller is pressed, electric power is supplied only to the motor so that the swivel gear member rotates and simultaneously swivels about the vertical shaft along the stationary gear member. As a result, the swivel member swivels with the tilt member relative to the base member.

When a tilting button of the remote controller is pressed, power is applied to the solenoid device to pull the motor backwards so that the swivel gear member is disengaged from the stationary gear member, but the motor shaft is coupled to the tilt gear member. Then, the motor drives the tilt gear member to tilt the rack gear member and the tilt member relative to the swivel member.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 1:
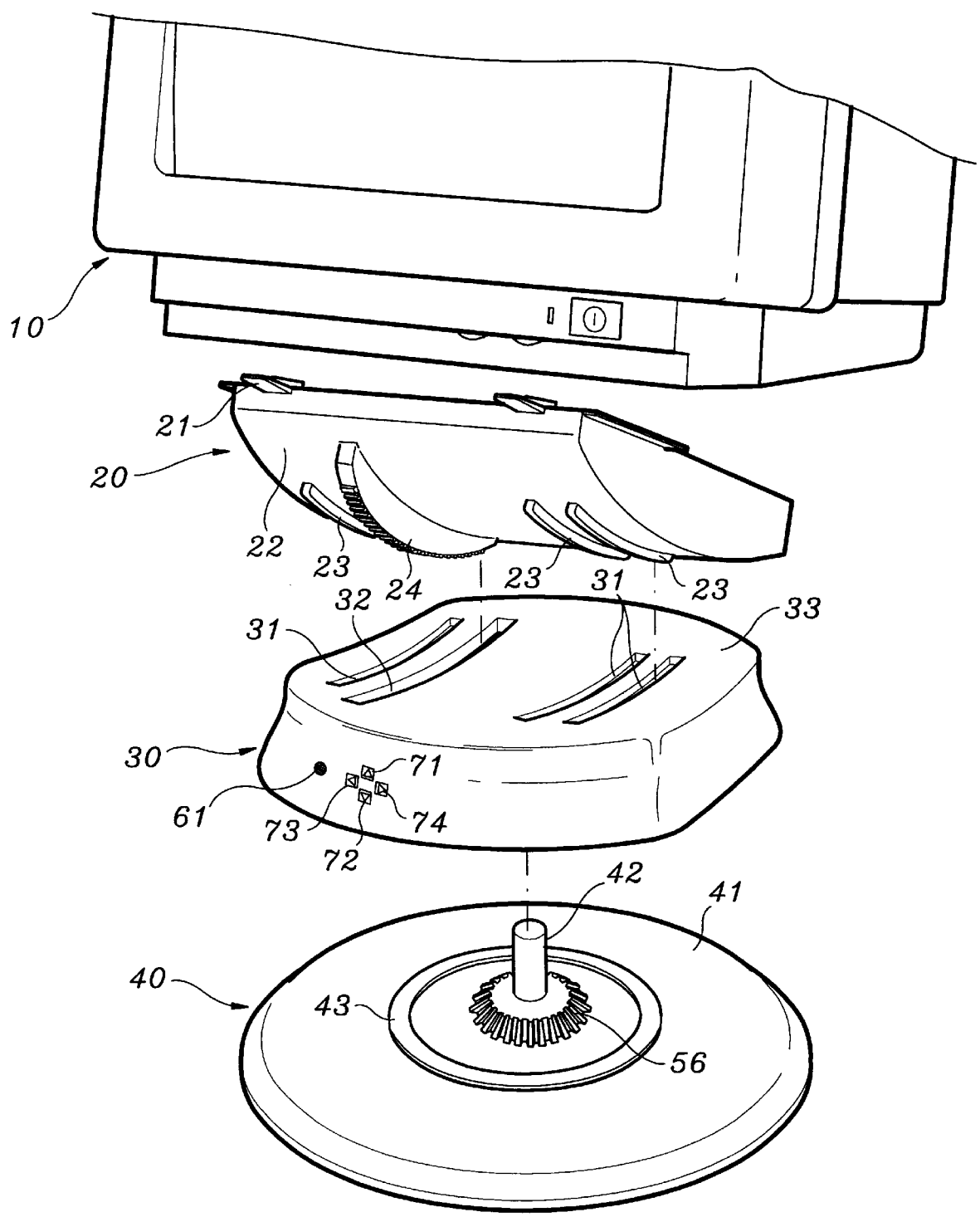
FIG. 1 is an exploded perspective view of a tilt and swivel apparatus according to the present invention.

As shown in FIG. 1, the tilt and swivel apparatus according to the present invention includes a tilt member 20 detachably connected to the bottom surface of a monitor 10 by several hooks 21. The tilt member 20 includes a spherically convex bottom surface 22, a plurality of arcuate guide blocks 23 extending downwardly from the bottom surface 22, and an arcuate rack gear member 24 extending downwardly from the bottom surface 22.

In addition there is provided a swivel member 30 being contact with and supporting the bottom surface 22 of the tilt member 20, the swivel member 30 including a spherically concave top surface 33. On the top surface 33 of the swivel member 30, there are provided a plurality of parallel grooves 31 for leading each guide block 23 to move slidably therein, and a slot 32 for the rack gear member 24 to pass through.

While the tilt member 20 moves back and forth on the swivel member 30, each groove 31 guides the guide block 23 for a tilting movement of the tilt member 20. The rack gear member 24 passes through the slot 32 and is arranged in the swivel member 30.

The swivel member 30 is rotatably mounted on a base member 40. The swivel member 30 is supported on the upper end of a vertical shaft 42 extending upwardly from the center of a base member 40 by means of a bearing 44 in FIG. 2 and is supported on the base member 40 by means of a bearing 43 mounted on the bottom surface 41 of the base member 40. A stationary gear member 56 is fixed on the vertical shaft 42 of the base member 40.

Figure 2:
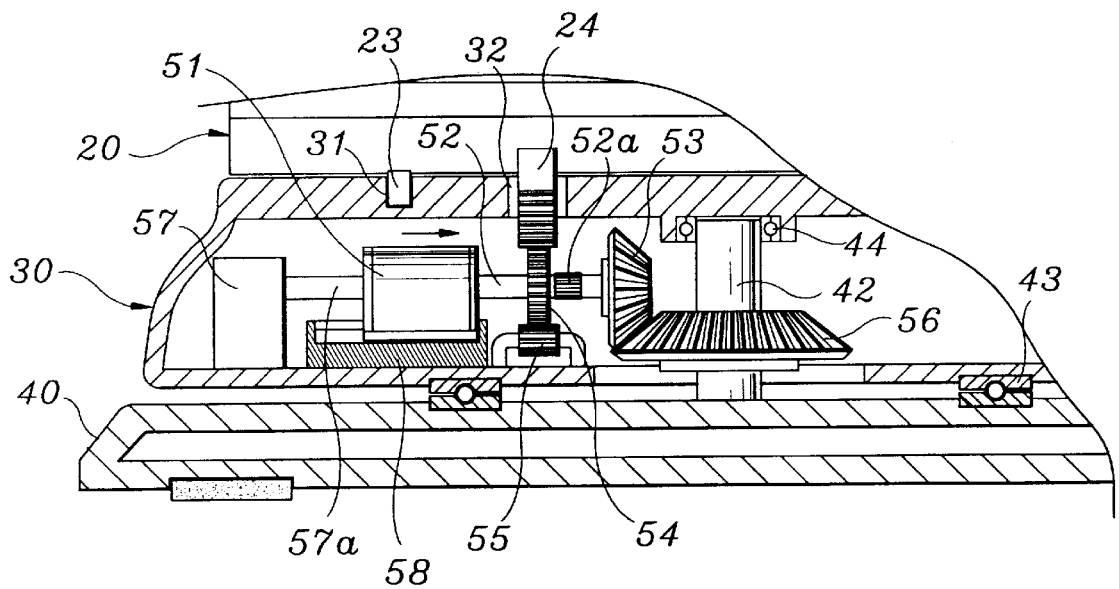
FIG. 2 is a cross-sectional segmented view illustrating the tilt and swivel apparatus in a swivel mode according to the present invention.

As shown in FIG. 2, an electric motor 51 is slidably mounted on the bottom surface of the swivel member 30 for tilting the tilt member 20 or swiveling the swivel member 30 and the tilt member 20 together relative to the base member 40 about the vertical shaft 42.

The motor 51 is slidably mounted on a mounting block 58 fixed on the bottom surface of the swivel member 30 towards the vertical shaft 42. A solenoid device 57 is connected to the rear end of the motor 51. Therefore, if the solenoid device 57 is powered, its shaft 57a moves forwards to push the motor 51. Otherwise, it returns back by means of a return spring (not shown) to pull the motor 51 backwards.

As shown in FIG. 2, a swivel gear member 53 is fixed on the end of the motor shaft 52 and moves forwards to be engaged with the stationary gear member 56 as the solenoid device 57 is powered.

Then, the motor 51 is powered to rotate the swivel gear member 53 about its shaft 52. In this case, since the stationary gear member 56 is fixed on the vertical shaft 42 of the base member 40, the swivel gear member 53 rotates about the motor shaft 52 and simultaneously swivels around the vertical shaft 42 along the stationary gear member 56.

Figure 3:
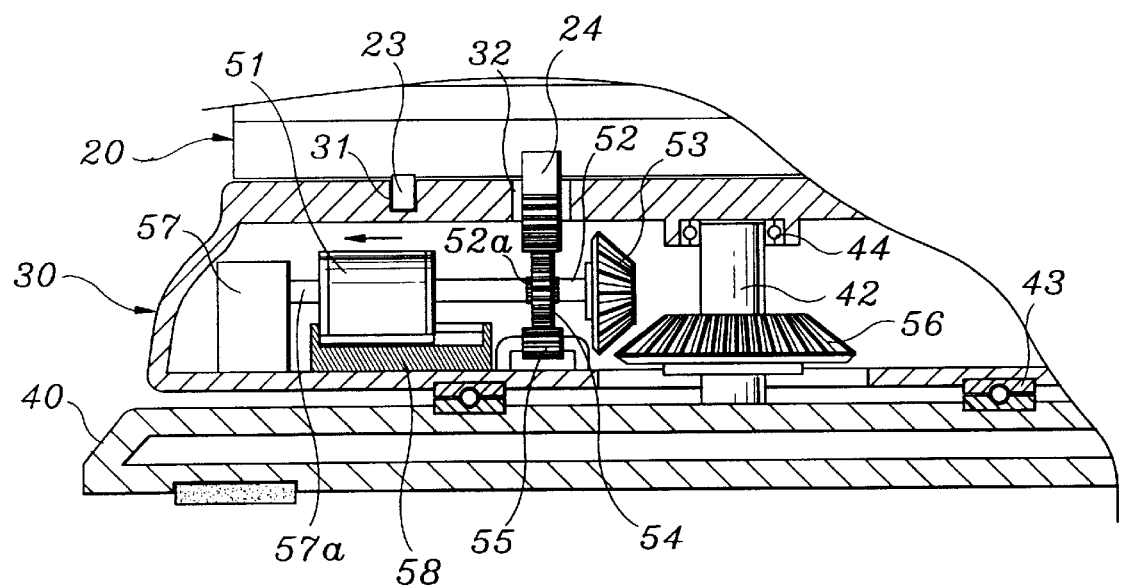
FIG. 3 is a cross-sectional segmented view illustrating the tilt and swivel apparatus in a tilt mode according to the present invention.

A tilt gear member 54 is always engaged with the rack gear member 24 and slidably supported on the motor shaft 52. The tilt gear member 54 has a splined axial hole and meshes with a splined portion 52a on the motor shaft 52 as the motor 51 moves to a direction indicated by an arrow, as shown in FIG. 3. The tilt gear member 54 is supported on an idle gear 55 mounted on the bottom surface of the swivel member 30.

As shown in FIG. 1, a receiver 61 is provided on a front side wall of the swivel member 30 to receive a tilt signal or a swivel signal from a remote controller (not shown). Also, in the swivel member 30, there are installed a controller (not shown) for receiving an electrical signal from the receiver 61, and a switch member (not shown) for receiving the electrical signal from the controller and sequentially supplying an electric power to the solenoid device 57 and the motor 51 or supplying the power directly only to the motor 51.

When a tilting button of the remote controller is pressed for tilting the display monitor, the receiver 61 shown in FIG. 1 receives a tilt signal and transmits the same to the controller. Accordingly, the controller operates the switch member so that the power is supplied sequentially to the solenoid device 57 and the motor 51 at a predetermined intervals.

In this case, as shown in FIG. 3, a shaft 57a of the solenoid device 57 pulls the motor to a direction indicated by an arrow, so that the swivel gear member 53 is disengaged from the stationary gear member 56, but the splined portion 52a of the motor shaft 52 is coupled to the tilt gear member 54. Subsequently, the motor 51 drives the tilt gear member 54 to rotate the rack gear member 24 and tilt the tilt member 20 relative to the swivel member 30.

During tilt movement of the tilt member 20, each guide block 23 of the tilt member 20 is guided in the groove 31 formed on the swivel member 30.

If another tilting button of the remote controller is pressed for tilting the display monitor reversely, the motor 51 rotates reversely to tilt the display monitor in a direction opposite to the above-described tilting direction.

When a swiveling button of a remote controller is pressed for swiveling the display monitor, the receiver 61 shown in FIG. 1 receives a swivel signal and transmits the same to the controller. Then, the controller receives the swivel signal and switches the switch member so that the power is supplied only to the motor 51 without being supplied to the solenoid device 57.

In this case, as shown in FIG. 2, since the power is not supplied to the solenoid device 57, a shaft 57a of the solenoid device 57 is subjected to a force of a spring (not shown) to move the motor 51 in a direction indicated by an arrow, so that the swivel gear member 53 is engaged with the stationary gear member 56 and the splined portion 52a of the motor shaft 52 is disengaged from the tilt gear member 54.

Then, the motor 51 drives the swivel gear member 53. The swivel gear member 53 rotates about the motor shaft 52 and simultaneously swivels along the stationary gear member 56 around the vertical shaft 42 of the base member 40.

If another swiveling button of the remote controller is pressed, the motor 51 rotates reversely to swivel the display monitor in a direction opposite to the above swiveling direction.

In the present invention, as shown in FIG. 1, there are provided manual buttons on the front side wall of the swivel member 30 so as to tilt or swivel the display monitor. The manual buttons include upper and lower tilting buttons 71 and 72 for tilting the display monitor up and down, and swiveling buttons 73 and 74 for swiveling the display monitor left and right. Thus, if the manual buttons are pressed, the display monitor is tilted or swiveled in the same manner as in manipulating the same by the remote controller.

According to the present invention, the display monitor can be mechanically tilted or swiveled only by manipulating a remote controller. Also, since a single motor is used in tilting or swiveling the display monitor, the structure is simplified. Therefore, a compact apparatus can be attained and manufacturing cost can be reduced.

Although the present invention has been described in connection with a preferred embodiment thereof, it will be appreciated by those skilled in the art that additions, deletions, modifications, substitutions not specifically described may be made without departing from the spirit and scope of the invention as defined in the appended claims.

What is claimed is:

1. An apparatus for tilting and swiveling a display monitor, comprising:

a tilt member adapted to be detachably connected to a bottom surface of the display monitor and having a convex bottom surface, a plurality of guide blocks extending downwardly from the bottom surface, and a rack gear member;

a swivel member supporting said tilt member thereon and having a plurality of grooves to guide said guide blocks, respectively, and a slot for said rack gear member to pass through;

a base member for rotatably supporting said swivel member around a vertical shaft thereon;

a stationary gear member fixed on the vertical shaft of said base member;

a swivel gear member adapted to be engaged with said stationary gear member;

a tilt gear member adapted to be engaged with said rack gear member of said tilt member;

a motor mounted on said swivel member so as to selectively drive either said swivel gear member or said tilt gear member; and a solenoid device to force said motor to move back and forth relative to said swivel member so that a shaft of the motor is selectively coupled to either said swivel gear member or said tilt gear member.

2. The apparatus according to claim 1, further comprising a receiver for receiving a tilt signal or a swivel signal from a remote controller; and a controller for supplying a power to said solenoid device and/or said motor according to the signal received by the receiver.

3. The apparatus according to claim 1, wherein said swivel gear member is fixedly mounted on the end of a shaft of the motor and said tilt gear member is coupled to and driven by the shaft of the motor when said swivel gear member disengages from said stationary gear member.

* * * * *